United States Patent
Kubo et al.

(10) Patent No.: US 7,224,946 B2
(45) Date of Patent: May 29, 2007

(54) FLIP ELECTRONIC EQUIPMENT

(75) Inventors: Tetsuya Kubo, Yokohama (JP); Tsutomu Abe, Kawasaki (JP); Mamoru Yoshida, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 137 days.

(21) Appl. No.: 10/505,510

(22) PCT Filed: Feb. 13, 2003

(86) PCT No.: PCT/JP03/01505

§ 371 (c)(1),
(2), (4) Date: Nov. 10, 2004

(87) PCT Pub. No.: WO03/071844

PCT Pub. Date: Aug. 28, 2003

(65) Prior Publication Data
US 2005/0159193 A1    Jul. 21, 2005

(30) Foreign Application Priority Data
Feb. 25, 2002    (JP)    ........................ P. 2002-048129

(51) Int. Cl.
*H04B 1/38* (2006.01)
(52) U.S. Cl. ................ 455/90.3; 455/575.1; 455/575.3
(58) Field of Classification Search ............... 455/90.3, 455/575.1, 575.3
See application file for complete search history.

(56) References Cited

U.S. PATENT DOCUMENTS

| 4,121,160 | A |   | 10/1978 | Cataldo |  |
|---|---|---|---|---|---|
| 5,227,614 | A |   | 7/1993 | Danielson et al. |  |
| 5,681,176 | A | * | 10/1997 | Ibaraki et al. | 439/165 |
| 5,933,330 | A |   | 8/1999 | Beutler et al. |  |

FOREIGN PATENT DOCUMENTS

| JP | 6-201048 | A | 7/1994 |
| JP | 6-268724 | A | 9/1994 |
| JP | 7-212051 | A | 8/1995 |
| JP | 2002-124779 |   | 4/2002 |
| JP | 2002-134938 | A | 5/2002 |
| JP | 2002-134938 | * | 10/2002 |
| JP | 2002-319771 |   | 10/2002 |

* cited by examiner

*Primary Examiner*—Lana Le
*Assistant Examiner*—Tuan H. Nguyen
(74) *Attorney, Agent, or Firm*—Pearne & Gordon LLP

(57) ABSTRACT

To provide a flip electronic device in which even when rain water or the like enters therein to a certain extent, it is absorbed and hence an electric circuit therein is not affected. In the flip electronic device, slight clearances are formed between bearings (3a), (3b), (4a), (4b) for rotatably connecting first and second enclosures (1), (2), and cylindrical members (13), (14) formed coaxially with the bearings (3a), (3b), (4a), (4b), and hence rain water may enter through these clearances. Therefore, water-absorbing members (19), (20) are mounted to an end of a printed wiring assembly (17), and rain water entered through the clearances is absorbed by the water absorbing members (19), (20), so as to prevent an electric circuit located in the enclosure from being affected.

2 Claims, 4 Drawing Sheets

FLIP ELECTRONIC EQUIPMENT

TECHNICAL FIELD

The present invention relates to a foldable flip electronic device such as a mobile phone, PDA and others.

BACKGROUND ART

In general, when configuring a foldable electronic device, a first enclosure and a second enclosure are rotatably connected via bearings. However, in this case, what comes into question is how an electronic circuit in the first enclosure and an electronic circuit in the second enclosure are electrically connected with respect to each other.

Normally, it is configured in many cases by forming bearings and coaxial cylindrical members respectively on the first and second enclosures, inserting a flexible substrate which is turned once into the cylindrical member, connecting both ends of the flexible substrate respectively to electronic circuits provided in the first and second enclosures, and connecting the electronic circuits provided in the first and second enclosure with respect to each other.

In this arrangement, since the flexible substrate is not exposed to the outside, and hence good appearance is achieved, such a configuration is widely employed especially in mobile phones or other devices in recent years.

In this type of electronic device, since it is necessary to insert the flexible substrate into the cylindrical members and connect the flexible substrate to the electronic circuits in the first and second enclosures, the first and second cylindrical members have to be provided integrally with the first and second enclosures separately from the bearings respectively, and hence slight clearances are inevitably generated between the cylindrical members and the bearings. Therefore, when it is used in rain, rain water may enter through these clearances and may affect to the electrical circuits therein.

The present invention is intended to solve the problem described above, and it is an object of the present invention to provide a flip electronic device in which rain even when rain water enters therein to some extent, it is absorbed and hence an electric circuit is not affected thereby.

DISCLOSURE OF INVENTION

In order to achieve the object described above, the present invention includes bearings for supporting first and second enclosures rotatably with respect to each other, cylindrical members formed integrally with the first and second enclosures respectively and coaxially with the bearings, and a flexible substrate inserted into the cylindrical member at the midsection thereof and electrically connected to the electronic circuits provided in the first and second enclosures respectively at both ends thereof, and at least one of the electronic circuits provided respectively in the first and second enclosures includes a printed wiring assembly whereof the ends are located at the position in the vicinity of the cylindrical member, the printed wiring assembly and the flexible substrate are connected electrically with respect to each other at the portion located in the vicinity of the cylindrical member of the printed wiring assembly, and the portion of the printed wiring assembly located in the vicinity of the cylindrical member is provided with a water-absorbing member for absorbing water-drops entered into the cylindrical member.

With this arrangement, even when rain water enters through clearances between the cylindrical members or through the clearance between the cylindrical member and the bearing to some extent, such rain water is quickly absorbed by the water-absorbing member provided on the portion of the printed wiring assembly located in the vicinity of the cylindrical member and is prevented from entering into a principal portion of the printed wiring assembly, thereby having substantially no damaging on the electronic circuit.

Also, the present invention is configured in such a manner that the printed wiring assembly and the flexible substrate are detachably connected electromechanically with respect to each other with a connector provided on the portion of the printed wiring assembly located in the vicinity of the cylindrical member and a connector provided at the end of the flexible substrate, and the water-absorbing member is provided on the printed wiring assembly located in the vicinity of the cylindrical member opposing to the flexible substrate.

With this arrangement, the printed wiring assembly and the flexible substrate can be electrically and detachably connected with each other and hence can be assembled easily. In addition, when rain water, which may increase the possibility of corrosion and hence a contact failure when entered into the connector portion, is absorbed in advance by the water-absorbing member and hence does not reach the connector portion, whereby possibility of occurrence of such contact failure may be significantly reduced.

Figure 1:
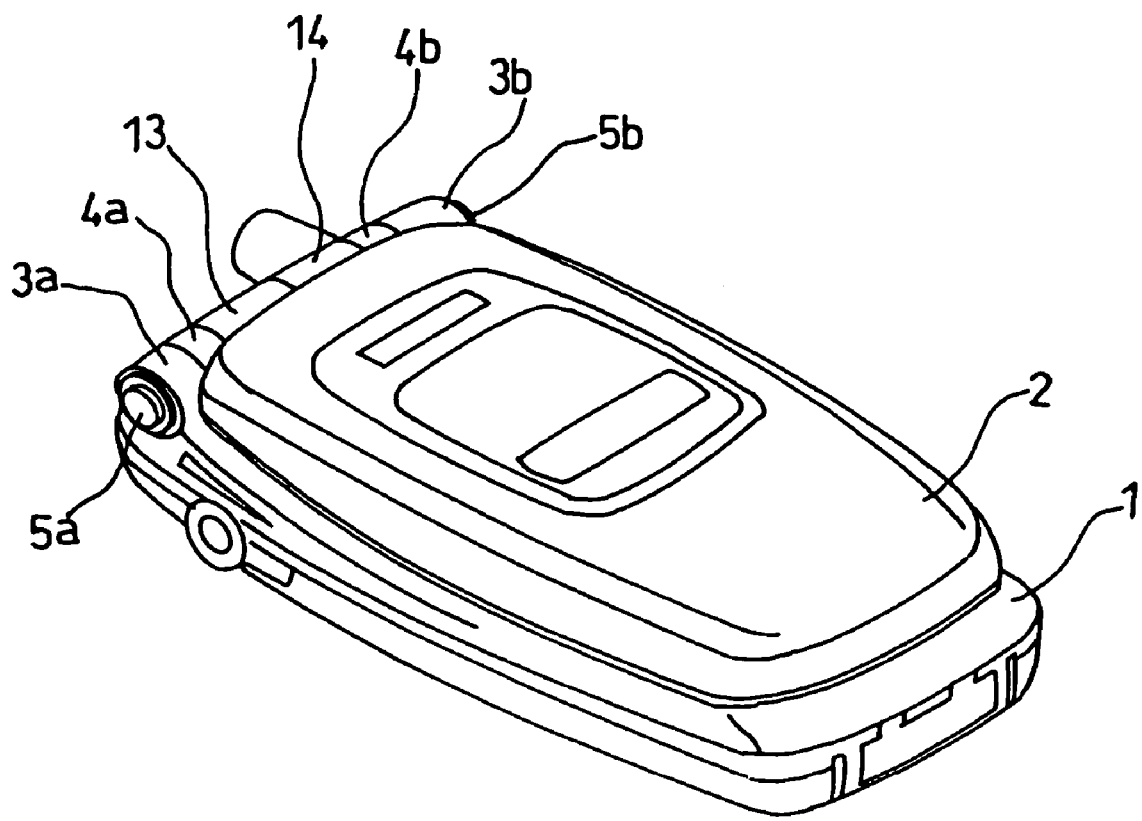
FIG. 1 is a perspective view of a flip electronic device in a folded state according to an embodiment of the present invention.

Reference numeral 1 designates a first enclosure, 2 designates a second enclosure, 3*a* and 3*b* designate bearings, 4*a* and 4*b* designate bearings, 5*a* and 5*b* designates shafts, 6 designates a navigation key, 7 designates a function key, 8 designates a ten key, 9 designates a transmitting unit, 10 designates an antenna, 11 designates a liquid crystal display unit, 12 designates a receiving unit, 13 designates a cylindrical unit, 14 designates a cylindrical unit, 15 designates a flexible substrate, 16 designates a connector, 17 designates a printed wiring assembly, 18 designates a connector, 19 designates a water-absorbing member, and 20 designates water-absorbing member.

BEST MODE FOR CARRYING OUT THE INVENTION

Referring now to the drawings, an embodiment of the present invention will be described.

Figure 2:
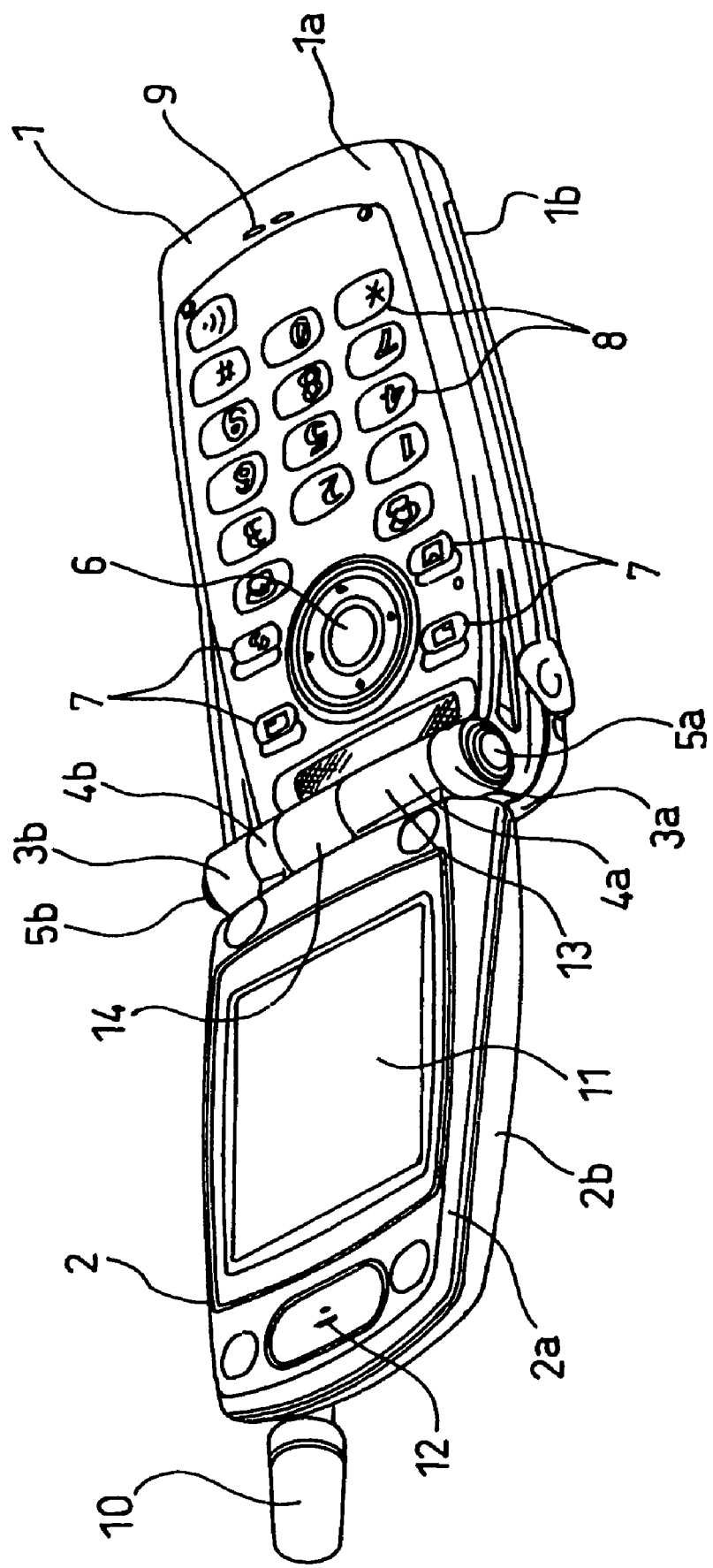
FIG. 2 is a perspective view of the flip electronic device in an opened state according to the embodiment of the present invention.
Figure 3:
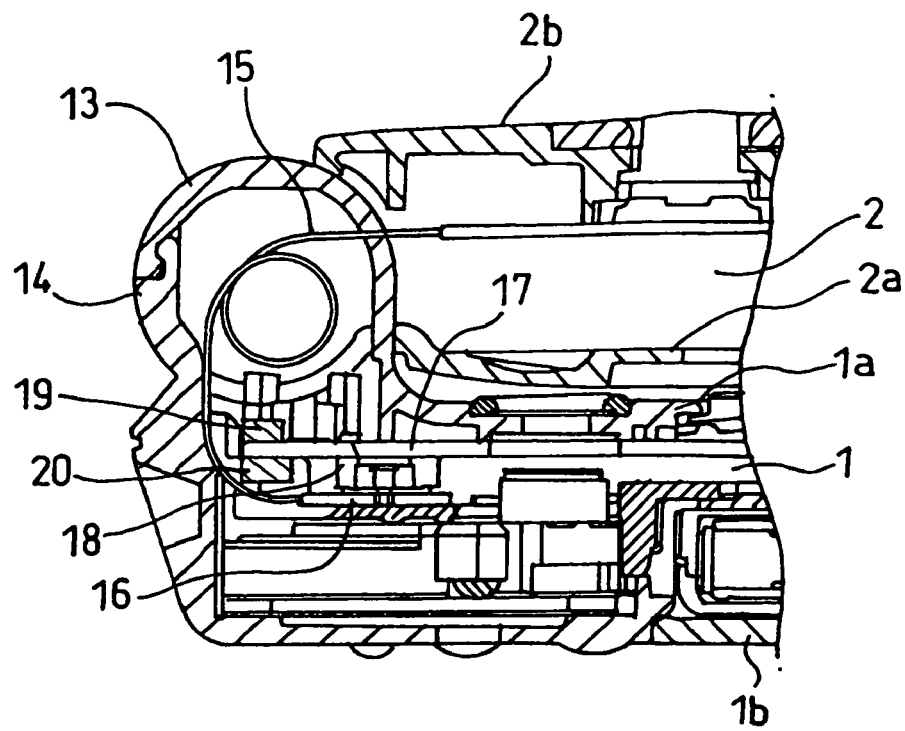
FIG. 3 is a cross-sectional side view of a principal portion of the flip electronic device in the folded state according to the embodiment of the present invention.
Figure 4:
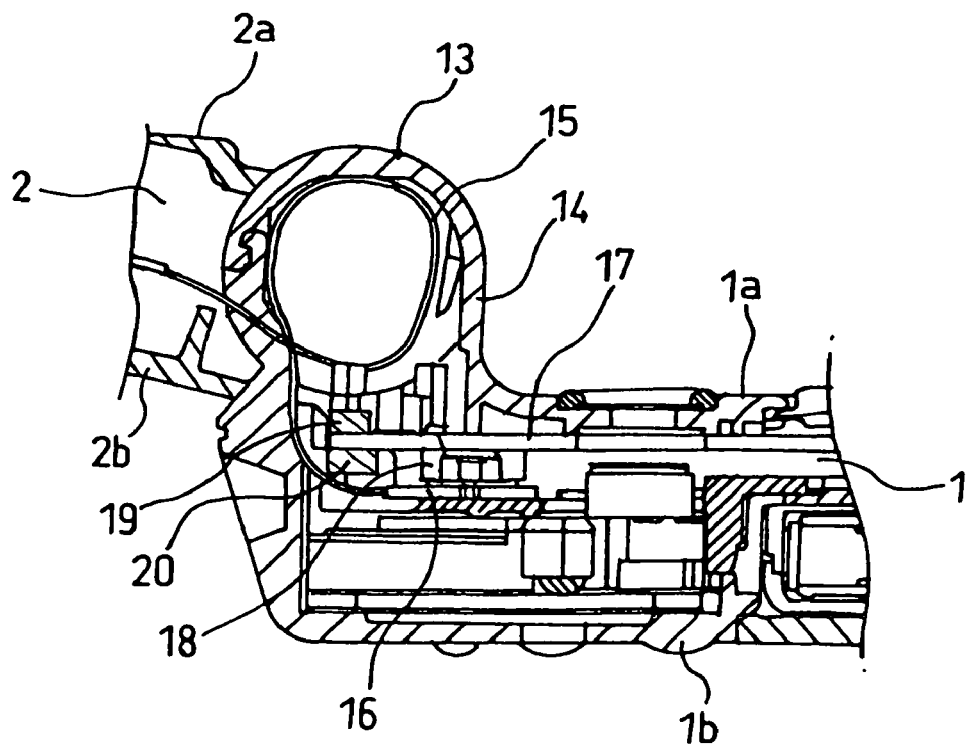
FIG. 4 is a cross-sectional side view of the principal portion of the flip electronic device in the opened state according to the embodiment of the present invention.
Figure 5:
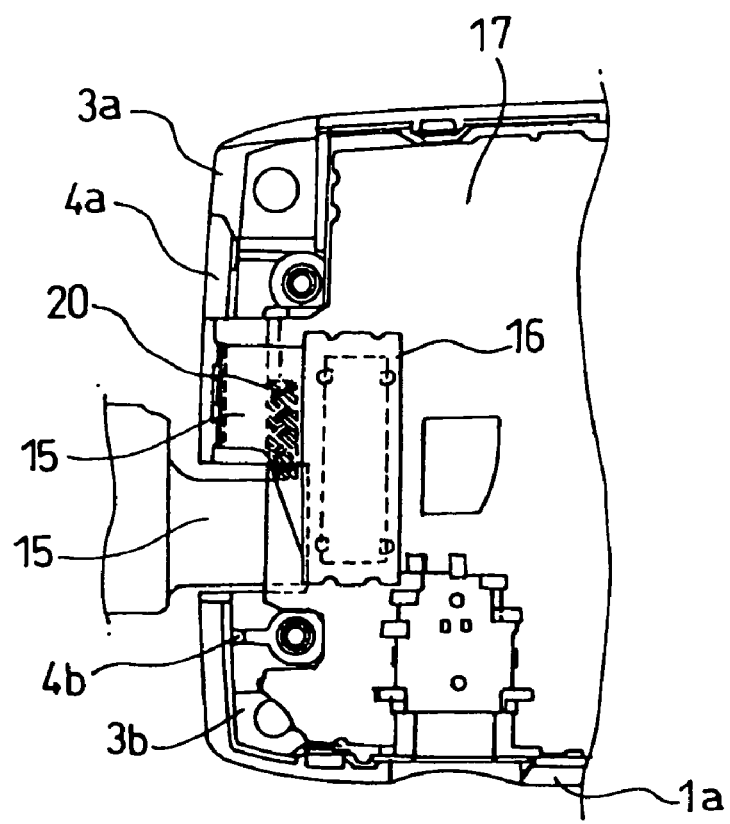
FIG. 5 is a back view of a principal portion showing a state in which a first enclosure constituting the flip electronic device according to the embodiment of the present invention.
Figure 6:
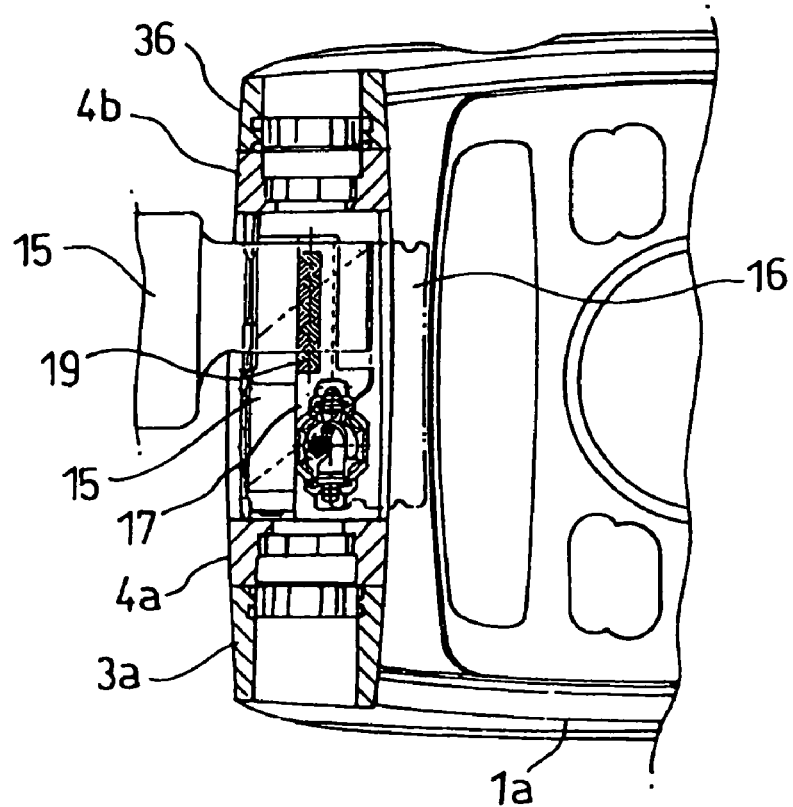
FIG. 6 is a front view of the principal portion showing a state in which a second enclosure is removed from the first enclosure constituting the flip electronic device in the embodiment of the present invention.

FIG. 1 is a perspective view of a flip electronic device in a folded state according to an embodiment of the present invention; FIG. 2 is a perspective view of the flip electronic device in an opened state according to the embodiment of the present invention; FIG. 3 is a cross-sectional side view of a principal portion of the flip electronic device in the folded state according to the embodiment of the present invention; FIG. 4 is a cross-sectional side view of the principal portion of the flip electronic device in the opened state according to the embodiment of the present invention; FIG. 5 is a back view of a principal portion showing a state in which a first enclosure constituting the flip electronic device according to the embodiment of the present invention; and FIG. 6 is a front view of the principal portion showing a state in which a second enclosure is removed from the first enclosure constituting the flip electronic device in the embodiment of the present invention.

As shown in FIG. 1 to FIG. 6, the flip electronic device according to the first embodiment of the present invention includes a first enclosure 1 and a second enclosure 2, the first enclosure 1 and the second enclosure 2 are rotatably supported by bearings 3a, 3b, 4a, 4b formed integrally with the first enclosure 1 and the second enclosure 2, respectively. In other words, the bearings 3a, 3b oppose to the bearings 4a, 4b, and they are connected by shafts 5a, 5b, respectively.

The present invention constitutes a flip mobile phone, in which the first enclosure 1 includes a navigation key 6, other various function keys 7, a ten key 8, a transmitting unit 9, and so on, and the second enclosure 2 includes an antenna 10, a liquid crystal display unit 11, and a receiving unit 12.

The first and second enclosures 1, 2 include upper enclosures 1a, 2a, and lower enclosures 1b, 2b respectively, the upper enclosures 1a, 2a and the lower enclosures 1b, 2b are formed integrally with arcuate members, respectively, which constitute cylindrical members 13, 14 extending coaxially with the bearings 3a, 3b, 3c, and 3d. In other words, although detailed configuration of the arcuate member is not shown, the arcuate members are configured in such a manner that when they are connected respectively to the upper enclosures 1a, 2a and the lower enclosures 1b, 2b, respectively, so that the upper enclosures 1a, 2a are connected to the lower enclosures 1b, 2b, respectively, the arcuate members are abutted against each other so as to form the cylindrical members 13, 14.

A flexible substrate 15 is inserted into the cylindrical members 13, 14 and the flexible substrate 15 electrically connects electric circuits provided on in the first and second enclosures 1, 2 with respect to each other. In other words, the flexible substrate 15 is electromechanically connected at one end to the electric circuit provided in the second enclosure 2, by soldering or other methods, and the wound portion formed at the center section thereof is stored in the cylindrical members 13, 14. The other end of the flexible substrate 15 is provided with a connector 16, and the connector 16 is detachably attached to a connector 18 mounted to a printed wiring assembly 17 provided in the first enclosure.

The printed wiring assembly 17 extends at the end to the position opposing to the cylindrical members 13, 14 in association with downsizing of the enclosure, and the connector 18 is mounted to the position in the vicinity of the end for the reason of wiring. The portion of the printed wiring assembly 17 located nearer to the end than the portion opposing to the connector 18 is provided with water-absorbing members 19, 20 having good water absorbing property on the front side and the back side thereof.

The embodiment of the present invention is configured as described above, and has a number of effects as described below. In other words, according to the present embodiment, since the first and second enclosures 1, 2 are rotatably mounted by the bearings 3a, 3b, 4a, 4b, and the flexible substrate 15 is stored in the cylindrical members 13, 14 which extend coaxially with the bearings 3a, 3b, 4a, 4b electrically connecting between the first and second enclosures 1, 2, the flexible substrate 15 is not exposed to the outside, and hence the good appearance is achieved.

Also, according to the present embodiment, since the portion between the cylindrical member 13 and the cylindrical member 14, and the portion between the cylindrical members 14, 13 and the bearings 3a, 3b, 4a, 4b are the portions rotating with respect to each other, the clearances are formed inevitably between these members, and hence rain water may enter into the cylindrical members 13, 14 through these clearances when used in the rain. However, since the printer wiring assembly 17 is provided with the water-absorbing members 19, 20 at the position closer to the end than the connector 18, even when rain water enters into the cylindrical members 13, 14, and is guided toward the printed wiring assembly 17 via the flexible substrate 15, it is absorbed by the water-absorbing members 19, 20 and the printed wiring assembly 17 and the connectors 16, 18 are prevented from being affected in advance. Especially, when the connector 18 is used as in the present invention, when rain water enters therein, serious problems such as corrosion or the contact failure may be resulted. However, according to the present embodiment, contact failure due to such causes may advantageously be prevented in advance.

Also the flip mobile phone is exemplified as the flip electronic device in the present embodiment, it is not limited to the mobile phone, and may be a PDA, a personal computer, or other electric devices. In the present embodiment, the water-absorbing member can be provided not only on the printed wiring assembly, but also at the position close to the cylindrical member of the flexible substrate or may be provided on both of them.

Although the present invention has been described in detail while referring to the specific embodiment, it is clear for those skilled in the art that various modifications or correction maybe made without departing the sprit and the scope of the present invention.

The present application is based on Japanese Patent Application No. 2002-048129 filed in Feb. 25, 2002, and the contents are herein cited as a reference.

INDUSTRIAL APPLICABILITY

As described above, according to the present invention, even when rain water enters through clearances between the cylindrical portion and bearings to some extent, it can be absorbed by the water-absorbing member in the enclosure. Therefore, it can hardly reach the electric circuit in the enclosure, and hence it is advantageously prevented from being affected.

The invention claimed is:

1. A flip electronic device comprising bearings for supporting first and second enclosures rotatably with respect to each other, cylindrical members formed integrally on the first and second enclosures respectively and coaxially with the bearings, and a flexible substrate inserted into the cylindrical member at the midsection thereof and electrically connected to the electronic circuits provided in the first and second enclosures respectively at both ends thereof, wherein at least one of the electronic circuits provided respectively in the first and second enclosures includes a printed wiring assembly whereof the ends are located at the position in the vicinity of the cylindrical member, the printed wiring assembly and the flexible substrate are connected electrically with respect to each other at the portion located in the vicinity of the cylindrical member of the printed wiring assembly, and the portion of the printed wiring assembly located in the vicinity of the cylindrical member is provided with a water-absorbing member for absorbing water-drops entered into the cylindrical member.

2. A flip electronic device according to claim 1, wherein the printed wiring assembly and the flexible substrate are detachably connected electromechanically with respect to each other with a connector provided on the portion of the printed wiring assembly located in the vicinity of the cylindrical member and a connector provided at the end of the flexible substrate, and the water-absorbing member is provided on the printed wiring assembly located in the vicinity of the cylindrical member opposing to the flexible substrate.

* * * * *